United States Patent [19]

Hunt

[11] Patent Number: 4,888,510
[45] Date of Patent: Dec. 19, 1989

[54] ROTARY ELECTRIC MACHINE
[75] Inventor: Peter Hunt, Hemel Hempstead, England
[73] Assignee: Lucas Industries, Inc., Birmingham, England
[21] Appl. No.: 295,541
[22] Filed: Jan. 11, 1989
[30] Foreign Application Priority Data Jan. 14, 1988 [GB] United Kingdom ............... 8800813

[51] Int. Cl.⁴ .......................... H02K 5/12; H02K 9/00
[52] U.S. Cl. ......................................... 310/54; 310/52; 310/89
[58] Field of Search ...................... 310/52, 53, 54, 89

[56] References Cited

U.S. PATENT DOCUMENTS

| 2,188,398 | 1/1940 | Bernard | 310/54 |
| 3,154,706 | 10/1964 | Richardson | 310/54 |
| 4,129,796 | 12/1978 | Papst | 310/43 |
| 4,250,423 | 2/1981 | Linscott | 310/258 |
| 4,590,397 | 5/1986 | Davis | 310/71 |
| 4,712,028 | 12/1987 | Horber | 310/49 R |
| 4,764,699 | 8/1988 | Nold | 310/258 |

Primary Examiner—Patrick R. Salce
Assistant Examiner—C. Laballe
Attorney, Agent, or Firm—Nixon & Vanderhye

[57] ABSTRACT

A stator of a rotary electric machine is supported in a housing structure and is secured therein against relative rotation or axial movement by angularly spaced fasteners. A circumferential passage in the stator communicates with a supply passage for liquid coolant. The temperature coefficients of expansion of the materials of the housing and the stator differ so that below a predetermined temperature those parts are an interference fit, and above that temperature channels are created between the fasteners, through which channels coolant can flow axially from the passage.

18 Claims, 3 Drawing Sheets

ROTARY ELECTRIC MACHINE

It is known from U.S. Pat. No. 4,278,928 to provide an electric generator in which a coolant is passed axially through a rotor and is also allowed to pass radially outwardly of the rotor under centrifugal action, to cool the ends of a surrounding stator winding. It is also known from GB-A-2029120 to secure and electric generator stator in a surrounding housing by providing that the stator remains an interference fit in the housing over the whole of a temperature range expected to be encountered in use. Since the housing is commonly of a light alloy which has a substantially higher thermal coefficient of expansion than that used for the laminated core of a stator, the tensile stress in the housing, particularly at lower operating temperatures may be very high. This latter reference also teaches the provision of axial grooves in an inner surface of the housing or an outer surface of the stator, though which grooves coolant can pass from one end of the generator to the other under the influence of gravity.

It is an object of the invention to provide a rotary electric machine in which coolant can be applied under pressure to the outer surface of a stator so as to contact a substantial part of that outer surface.

It is a further object of the invention to provide a rotary electric machine of the type generally disclosed in GB-A-2029120, and in which tensile stresses in the stator housing are reduced.

According to the invention there is provided a rotary electric machine comprising a stator, a rotor rotatable relative to said stator, a structure for supporting said stator, said stator and said structure having adjacent outer and inner surfaces, means for preventing relative rotation or axial movement between said stator and said structure and means for introducing a coolant fluid under pressure to said surface of the stator intermediate the ends thereof, the materials of said structure and said stator having different thermal coefficients of expansion and the dimensions of said stator and said structure, normal to the axes of rotation of said rotor, being such as to provide an interference fit between said surfaces below a predetermined temperature level and a clearance fit above that level.

An embodiment of the invention will now be described by way of example only and with reference to the accompanying drawings in which.

Figure 1:
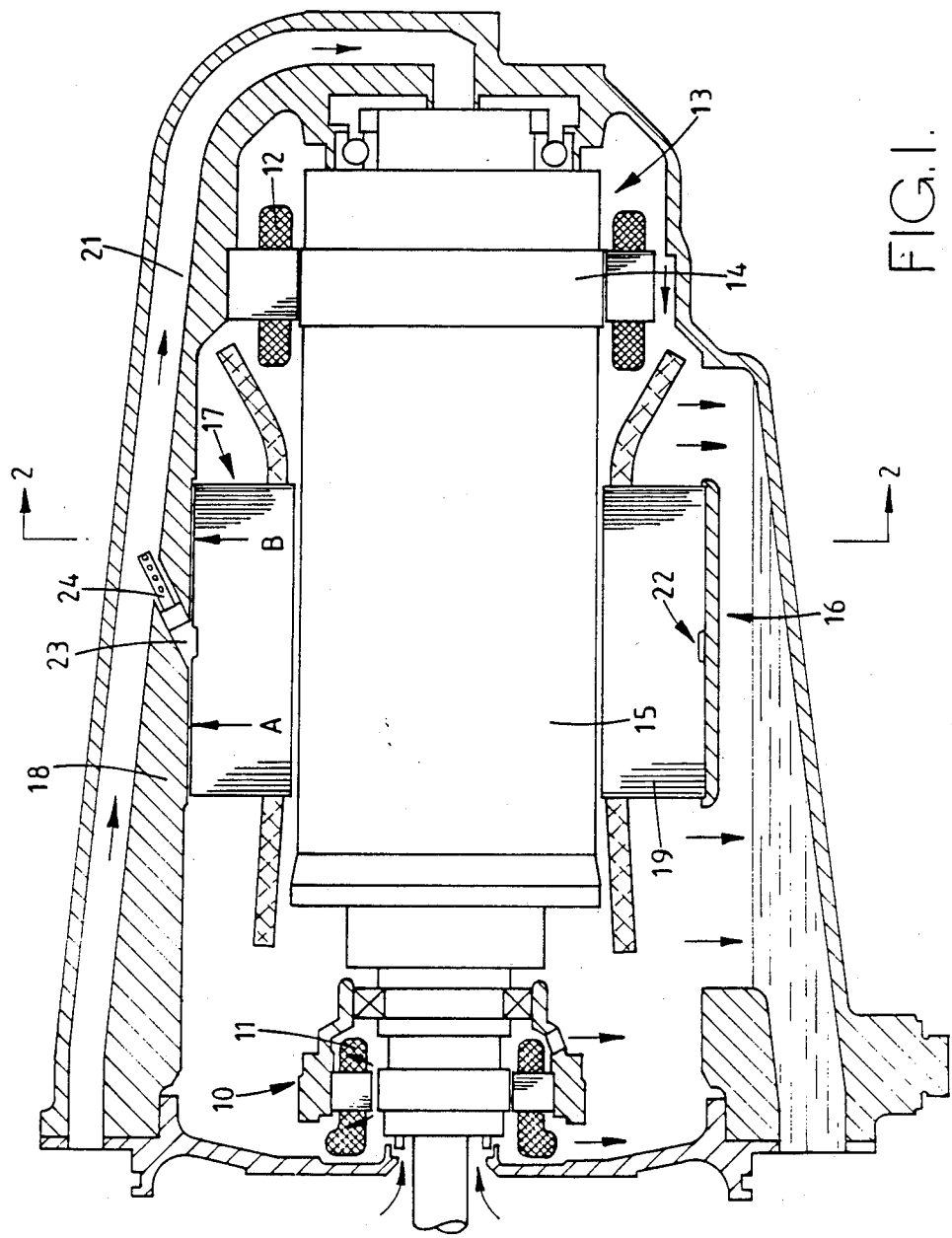
FIG. 1 is a longitudinal section through an electric generator.

FIG. 1 shows a brushless electric generator of the general type disclosed in U.S. Pat. No. 4,278,928, incorporated herein by reference. The generator includes a permanent magnet alternator 10 from whose stator winding 11 current is supplied to a stator winding 12 of an exciter alternator 13. Alternating current induced in a rotor portion 14 of the alternator 13 is rectified and supplied to the windings of a rotor 15 of a main alternator 16. Output current is induced in windings of a stator 17 of the main alternator 16. The stators 11, 12 and 17 are mounted in a stationary structure 18 which provides a housing for the stators.

Figure 2:
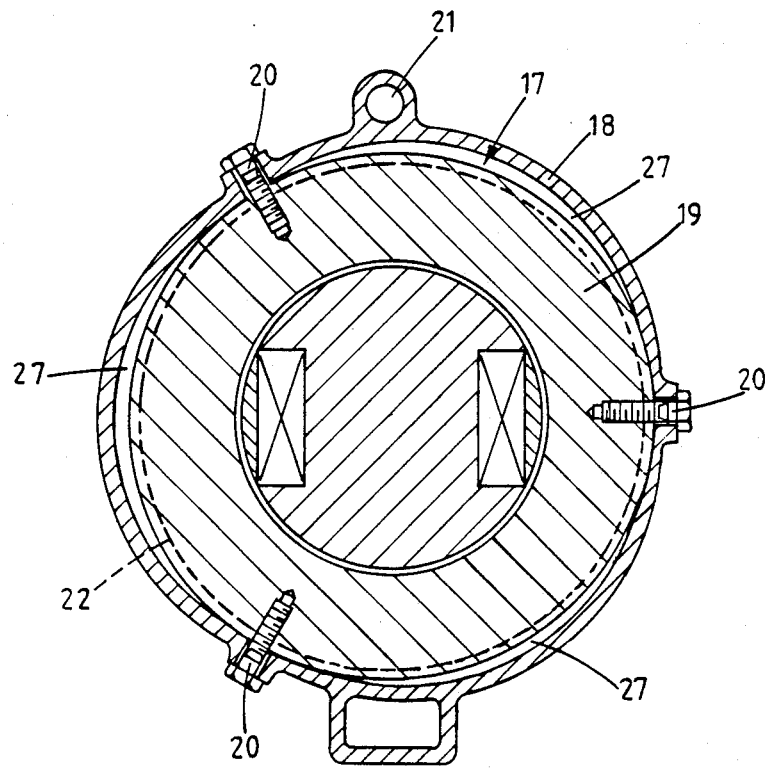
FIG. 2 is a section on line 2—2 in FIG. 1.

The material of the housing 18 is magnesium alloy having a thermal coefficient of expansion of 0.000027/unit length/°C. A laminated cobalt iron core 19 of the stator has a thermal coefficient of expansion of 0.0000095/unit length/°C. The laminations of the core 19 are bonded together with a high temperature adhesive and provide a cylindrical outer surface which is effectively impervious to oil under pressure. Alternatively the core 19 may be contained within a thin sleeve which provides the same effect. The core 19 is secured to the housing 18 at two axial locations indicated at A and B in FIG. 1. As shown in FIG. 2 the fixings at each axial location comprise three equi-angularly spaced bolts 20 extending through the housing 18 and securing the core 19 to the latter at a total of six locations.

The housing 18 has a passage 21 through which oil under pressure can be introduced axially of the rotors of the alternators 10, 13, 16 to cool the latter and to be ejected radially under centrifugal force to cool the turns of the surrounding stator windings.

Figure 3:
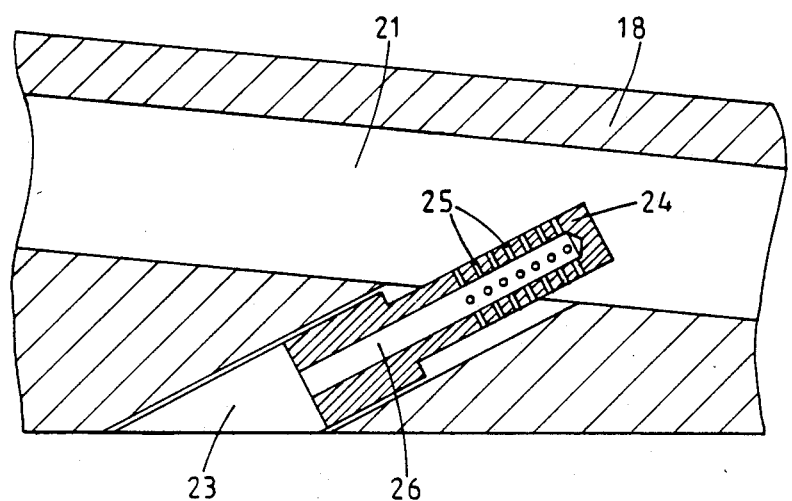
FIG. 3 is a section to an enlarged scale of a part of FIG. 1.

The stator core 19 has a peripheral groove 22 midway between its ends. A port 23 in the housing 18 lies adjacent the groove 22 and communicates with the passage 21 by way of a strainer 24 which, as shown in FIG. 3, is in threaded engagement with the housing 18 and has a plurality of transverse holes 25 which open into a central passage 26. The total cross-section of the holes 25 is greater than that of the passage 26.

The stator core 19 is initially assembled into the heated housing 18 so as to create an interference fit at room temperature of 20° C. The outer diameter of the core 19 and the diameter of the mating face of the housing 18 are selected so that, as a result of their different thermal coefficients of expansion the interference fit ceases to exist at a predetermined temperature and clearance between the parts thereafter exists with subsequent temperature rise. In the present example the nominal diameters of the mating surfaces are 147.3 mm the stator diameter being 0.127 mm larger than that of the housing 18 at 20° C. The interference will thereby cease to exist at a temperature 49° C. above 20° C. Thereafter continued differential expansion with increase in temperature will cause the housing 18 to expand away from the core 19 except at those locations where it is secured by the bolts 20. This effect is shown, much exaggerated, in FIG. 2 and results in clearance channels 27 extending axially of the stator core. The channels 27 are interconnected by the peripheral groove 22.

Thus, in use, at working temperatures which are more than 49° C. above the initial fitting temperature of 20° C. a part of the pressurised coolant in the passage 21 can flow from the groove 22 by way of the channels 27 to substantially the whole of the outer surface of the core 19. Moreover, further increase of temperature will increase the cross-sections of the channels 27 to permit an increased volume of coolant flow, up to a limit determined by the restriction provided by the passage 26.

In alternative embodiments a plurality of ports 23 may be provided, angularly spaced about the axis of the core 19, each of the ports 23 being in communication with the passage 21. In this alternative arrangement the groove 22 need not be provided.

I claim:

1. A rotary electric matching comprising a stator, a rotor rotatable relative to said stator, a structure for supporting said stator, said stator and said structure having adjacent inner and outer surfaces, and means for preventing relative rotation or axial movement between said stator and said structure, port means for introducing a fluid coolant under pressure to said surface of the stator intermediate the ends thereof, the materials of said structure and said stator having different thermal coefficients of expansion, the dimensions of said stator and said structure, normal to the axis of rotation of said rotor, being such as to provide an interference fit between said surfaces below a predetermined temperature level, and a clearance fit above that level, said clearance fit defining channels through which coolant can flow from said port means over said stator surface.

2. A machine as claimed in claim 1 in which said surfaces of said stator and said structure are outer and inner surfaces respectively, and the thermal coefficient of expansion of the material of said structure is higher than that of the material of said stator.

3. A machine as claimed in claim 1 or claim 2 in which one of said surfaces has a circumferential groove which communicates with said means for introducing coolant.

4. A machine as claimed in claim 3 in which said one surface is an external surface of said stator.

5. A machine as claimed in claim 1 in which said means for preventing relative rotation or axial movement comprises securing devices at circumferentially spaced locations on said surfaces.

6. A machine as claimed in claim 5 in which said devices are circumferentially spaced at each of a plurality of locations on said surfaces.

7. A machine as claimed in claim 1 in which said means for introducing coolant includes a supply passage, a port in said structure and a strainer device through which coolant can flow from said passage to said port.

8. A machine as claimed in claim 7 which includes a plurality of said ports angularly spaced about the axis of said stator.

9. A machine as claimed in claim 1 in which said temperature level is 69° C.

10. A rotary electric machine comprising:
 a stator having a surface with ends comprised of a material having a thermal coefficient of expansion;
 a rotor mounted for rotation relative to said stator;
 a structure for supporting said stator, said structure having a surface adjacent said stator surface, said structure comprised of a material having a thermal coefficient of expansion;
 means for preventing relative movement between said stator and said structure;
 port means for introducing a fluid coolant under pressure to said stator surface intermediate said ends thereof; and
 said stator and structure having dimensions, in a direction normal to said axis of rotation of said rotor, said dimensions and thermal coefficients of expansion comprising a means for defining an interference fit between said surfaces below a predetermined temperature and a clearance fit above said predetermined temperature, said clearance fit comprising means defining channels through which coolant can flow from said port means over said stator surface.

11. A machine as claimed in claim 10, wherein said stator surface and said structure surface are outer and inner surfaces, respectively, and said thermal coefficient of expansion of said structure material is higher than the thermal coefficient of expansion of said stator material.

12. A machine as claimed in claim 10 or claim 11, wherein one of said surfaces includes means defining a circumferential groove in communication with said port means for introducing coolant.

13. A machine as claimed in claim 12, wherein said one of said surfaces is an external surface of said stator.

14. A machine as claimed in claim 10, wherein said means for preventing relative movement comprises securing means at circumferentially spaced locations on said surfaces.

15. A machine as claimed in claim 14, wherein said securing devices are circumferentially spaced at each of a plurality of locations on said surfaces.

16. A machine as claimed in claim 10, wherein said port means for introducing coolant includes:
 a supply passage;
 a port in said structure; and
 a strainer device through which coolant can flow from said passage to said port.

17. A machine as claimed in claim 16, further including a plurality of said ports, angularly spaced about an axis of said stator.

18. A machine as claimed in claim 10 in which said temperature level is 69° C.

* * * * *